United States Patent [19]

Crawley et al.

[11] Patent Number: 4,834,587
[45] Date of Patent: May 30, 1989

[54] PNEUMATIC CONVEYING SYSTEM

[75] Inventors: Michael F. Crawley, Maryville, Tenn.; Brian Snowdon, Tickhill Smith, England

[73] Assignee: Macawber Engineering, Inc., Maryville, Tenn.

[21] Appl. No.: 55,411

[22] Filed: May 28, 1987

[51] Int. Cl.⁴ .............................................. B65G 57/66
[52] U.S. Cl. ........................................ 406/23; 406/32; 406/138
[58] Field of Search .................... 406/22, 23, 24, 25, 406/31, 32, 33, 34, 109, 136, 137, 138, 141, 142

[56] References Cited

U.S. PATENT DOCUMENTS

| | | |
|---|---|---|
| 1,535,991 | 4/1925 | Crom . |
| 3,437,384 | 4/1969 | Bozich ................................. 302/53 |
| 3,644,003 | 2/1972 | Von Fusk ............................ 302/53 |
| 3,671,079 | 6/1972 | Huffaker ............................. 302/29 |
| 3,799,622 | 3/1974 | Hek ..................................... 302/28 |
| 3,844,446 | 10/1974 | Solt ..................................... 222/61 |
| 3,937,521 | 2/1976 | Reuter ................................. 302/3 |
| 4,005,908 | 2/1977 | Freeman ............................. 302/3 |
| 4,118,075 | 10/1978 | Lubbehusen ........................ 302/53 |
| 4,137,935 | 2/1979 | Snowdon ............................ 137/242 |
| 4,168,864 | 9/1979 | Weeks ................................. 406/23 |
| 4,200,412 | 4/1980 | Steele ................................. 406/24 |
| 4,221,507 | 9/1980 | Olney ................................. 406/33 |
| 4,353,668 | 10/1982 | Anderson ........................... 406/138 |
| 4,486,100 | 12/1984 | Endo et al. ......................... 406/23 |
| 4,488,837 | 12/1984 | Mizokawa et al. ................. 406/34 |
| 4,525,107 | 6/1985 | Feldsted ............................. 406/25 |
| 4,593,727 | 6/1986 | Ulveling ............................. 141/5 |
| 4,697,962 | 10/1987 | Dunbar et al. ..................... 406/32 |

FOREIGN PATENT DOCUMENTS 1010014  6/1957  Fed. Rep. of Germany ...... 406/138

Primary Examiner—Sherman D. Basinger
Assistant Examiner—Stephen P. Avila
Attorney, Agent, or Firm—Luedeka, Hodges & Neely

[57] ABSTRACT

An apparatus and method for continuously dispensing particulate material utilizes a transfer vessel which may be placed at a location spaced below and apart from a dispensing vessel. Particulate material may be transferred from the transfer vessel to the dispensing vessel by aerating the particulate material and pneumatically transferring the material to the dispensing vessel through a suitable pipeline. Valving on the dispensing vessel and the transfer vessel prevents loss of pressure from the system during operation. The air supply for transfer and dispensing may be provided by one source. The dispensing unit may continuously dispense material through repeated cycles of transfer of material from the transfer vessel.

17 Claims, 4 Drawing Sheets

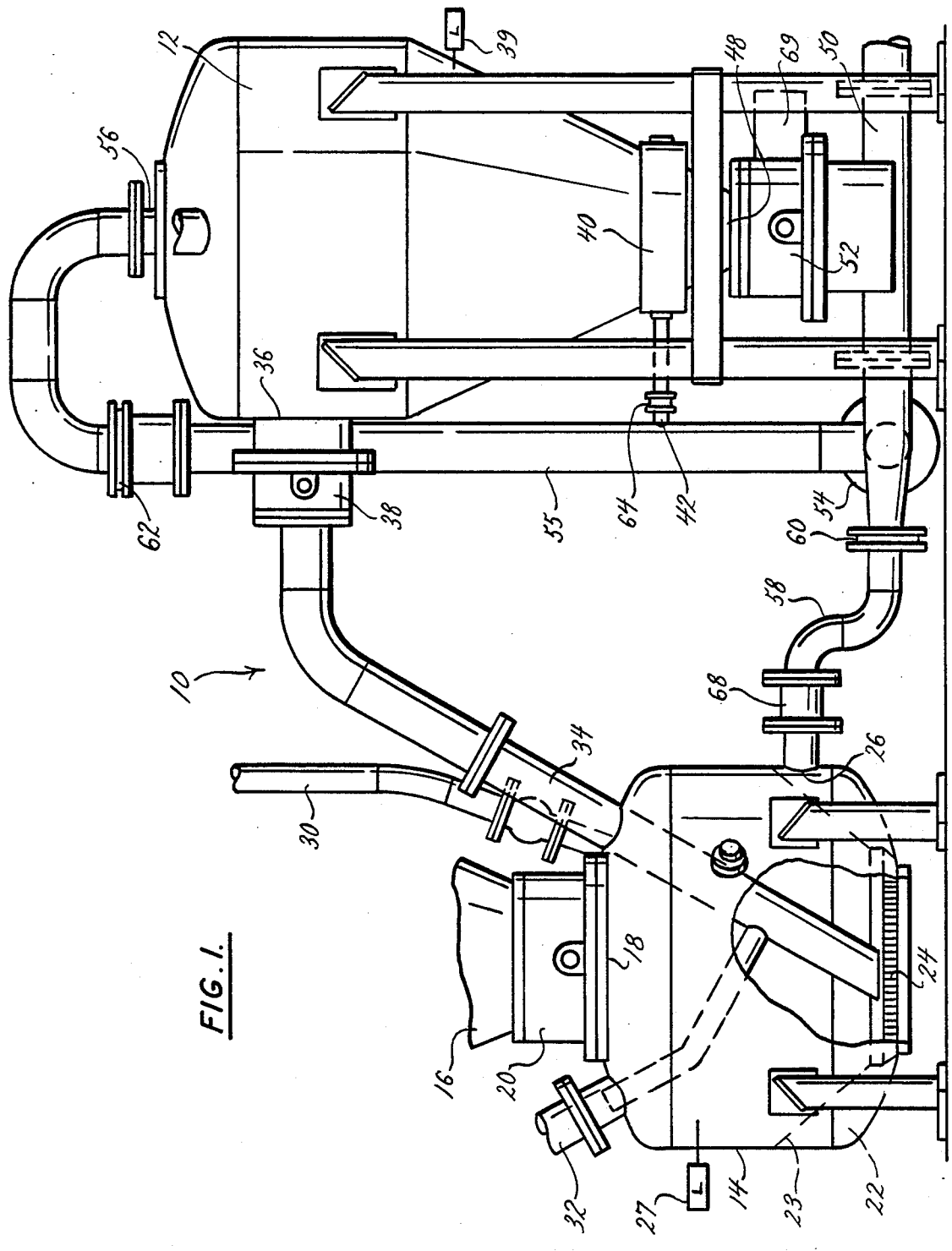

PNEUMATIC CONVEYING SYSTEM

BACKGROUND AND SUMMARY OF THE INVENTION

The present invention relates to a device for a continuous introduction of bulk material into a pneumatic conveyer line and particularly relates to a pneumatic bulk transfer device having an intermittently fed transfer vessel that intermittently feeds a dispensing vessel.

The present invention is intended to be used in areas where there is a height limitation which restricts the maximum height of a material transferring dispensing device. Many conventional devices distribute or dispense particulate material, such as sand and cement, from a dispensing vessel under the influence of gravity. Where the flow of the dispensed material is metered, it is conventional to use a series of stacked vessels. The lowermost vessel is a dispensing vessel from which the material is dispensed in metered quantities. The uppermost vessel or vessels are transfer and supply vessels from which material is transferred into the dispensing vessel. This arrangement results in a structure which is quite tall and requires extensive headroom on site. Where sufficient headroom is not available other structure must be used, for example, a conventional structure places a supply or transfer vessel apart from a dispensing vessel and transfers material from the transfer vessel to the dispensing vessel using screw conveyers, airlifts or pneumatic conveyers and similar equipment. U.S. Pat. No. 3,844,446 illustrates a conventional arrangement.

Many conventional methods have the disadvantage of requiring high power consumption for moving parts, or of having high wear rates of moving parts or pneumatic tubing or require quantities of high pressure air at several pressures, as is not normally available on a site of this type. Conventional methods using blow tanks, for example, usually require multiple blow tanks to achieve enough throughput to supply the dispensing vessel for continuous dispensing or limit the output of the dispensing vessel. Transfer from a blow tank is semi-batch in nature; transfer must stop to permit the blow tank to accumulate sufficient material to supply the dispensing vessel.

Applicants have devised a method and apparatus for supplying a dispensing vessel that will continuously dispense and meter large quantities of pulverized or granular material, and applicant's apparatus is small in height compared to conventional stacked transfer devices. A transfer vessel of the present invention is capable of feeding a dispensing vessel from a remote location and both vessels use one source of pressurized fluid, typically pressurized air, for transferring, fluidizing, metering and dispensing the material. The one source, however, is utilized to provide multiple pressure outputs. For example, orifice plates can be used to provide different pressure feeds to the components in applicant's system.

In accordance with one embodiment of the present invention a transfer vessel is operated intermittently to feed a dispensing vessel and obtain continuous output from the dispensing vessel. The transfer vessel need not be large, but can be cycled sufficiently rapidly to maintain the dispensing vessel with a continuous output. Applicant's method and device dispenses uniform quantities of almost any pulverized or granular material, for example, sand, cement, powdered plastic resins and other materials having a wide range of densities. The throughput through applicant's equipment is produced by a low to moderate pressure differential and at sufficiently low linear velocity that the wear on the material is not excessive. Applicant's structure can be used to replace existing units and can fit in cramped quarters. The device does not require excessive headroom. Applicant's device permits the transfer vessel to be separated from the dispensing vessel in a wide variety of configurations to accommodate the available site configuration. This has the advantage of permitting the equipment to be installed in a variety of locations currently existing without the requirement for expensive remodeling of the site or new site construction.

It is thus an object of the applicant's invention to provide a conveying and dispensing system which is effective to handle substantially all pulverized and granular material.

It is a further object of applicant's invention to provide a dispensing and conveying system which transfers material from a transfer vessel spaced apart from a dispensing vessel.

It is a further object of applicant's invention to provide a conveying and dispensing system which can operate to continuously dispense material while intermittently transferring material from a small transfer vessel to a larger dispensing vessel.

It is a further object of applicant's invention to provide a conveying and dispensing system which can use air from one pressure source for fluidizing, transferring and metering material.

It is a further object of applicant's invention to balance the pressure as required in applicant's system by using orifices to maintain the pressure drop within the components of the system at the needed levels.

BRIEF DESCRIPTION OF THE DRAWINGS

The invention may be further understood by reference to the drawings and the Description of the preferred embodiments in which:

FIG. 1 is a front view of applicant's transferring and dispensing equipment;

DESCRIPTION OF THE PREFERRED EMBODIMENTS

Figure 2A:
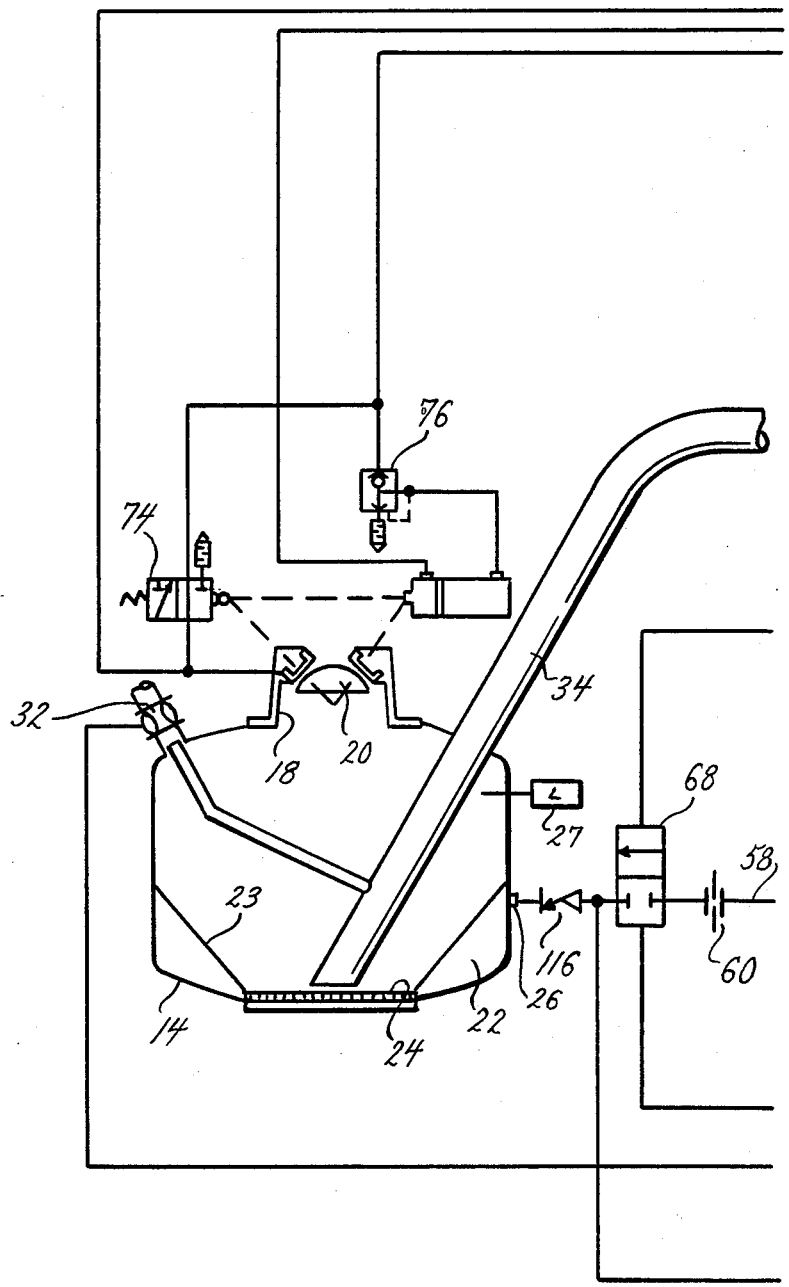
FIG. 2a through 2c are schematic views of applicant's transfer equipment and a control system for the operation of the equipment.

Referring to the drawings in which like reference characters designate like or corresponding parts throughout the several views, FIG. 1 illustrates a transferring and dispensing equipment 10 embodying one form of the present invention. The equipment 10 includes a dispensing vessel 12 that is intermittently fed from a transfer vessel 14 which, in turn, is intermittently fed from a material source or hopper 16. The transfer vessel 14 has an inlet 18 in communication with hopper 16, and valve 20 is positioned in inlet 18 to control the feed of material therethrough. The valve 20 is preferably a pressure dome valve of the type disclosed in U.S. Pat. No. 4,137,935. Below the valve 20, the bottom of the transfer vessel 14 is formed into a plenum 22 by a partition 23 which terminates in an annular set of porous brushes 24. It will be appreciated that a membrane, such as a perforated plate or other foraminous structure may be used in place of the plenum and brushes, as is known in the art. In the region of the plenum 22 an air inlet 26 is formed in the transfer vessel and, outside of the plenum 22 transfer vessel 14 also has a vent 30, an alternate or auxiliary air inlet 32 and an outlet pipe 34 extending from near the bottom of the transfer vessel and connecting with the dispensing vessel 12.

The outlet pipe 34 from transfer vessel 14 extends through an entrance 36 in dispensing vessel 12, and a valve 38, such as a rotary pressure valve of the type disclosed in U.S. Pat. No. 4,137,935 or a suitable equivalent valve, is located in entrance 36 for controlling flow into the dispensing vessel 12. Dispensing vessel 12 also has a plenum 40 formed around the periphery of dispensing vessel 12, and this plenum 40 is connected with a source of pressurized air through a line 42. Within the plenum 40, perforations 44 are provided in the wall 46 of dispensing vessel 12 to provide fluid communication with the interior of dispensing vessel 12 for the air supplied to the plenum 40 through line 42. Below the plenum 40 at the base of dispensing vessel 12, an outlet 48 communicates with outlet line 50 to dispense material from the vessel 12. The outlet 48 is also provided with a valve 52, which may also be a pressure dome valve of the type described in U.S. Pat. No. 4,137,935 or a suitable equivalent valve, and it controls the dispensing of material from the vessel 12.

A single source of pressurized air, such as pipeline 54, provides the power needed for operating the transfer vessel 14 and the dispensing vessel 12 and for activating the valves and controls as needed. Line 55 extends from line 54 to inlet 56 and is the source of pressurized air for dispensing vessel 12, and, likewise, line 58 branches off line 54 and provides a source of pressurized air to the transfer vessel 14 through the inlet 26. Alternatively line 58 could be connected to the auxiliary inlet 32. Branching off main line 54, line 42 provides a fluidizing air to the dispensing vessel 12 through plenum 40.

The airflow in the system is balanced to provide a positive pressure differential between transfer vessel 14 and dispensing vessel 12 and to provide a positive differential pressure between the air in plenum 40 and the interior of transfer vessel 12. Line 58 has an orifice plate 60 placed just upstream of transfer vessel 14, and line 55 also has an orifice plate 62 just upstream of the entrance to the dispensing vessel 12. An orifice plate 64 is positioned in line 42 just upstream of the plenum 40. Orifice plates 60 and 62 are sized to maintain a positive pressure drop between transfer vessel 14 and dispensing vessel 12. This pressure drop is normally selected to be in the range of between about two psi to two and one half pounds per square inch (2–2½ psi), but may be more or less if desired. Normally effective transfer can be accomplished at pressure drops as low as above about one pound per square inch (1 psi) in a typical system. Orifice plate 64 is also sized to provide a positive pressure drop of above about one pound per square inch into the interior of dispensing vessel 12 through plenum 40 to maintain the material in dispensing vessel 12 in an aerated condition.

Figure 2B:
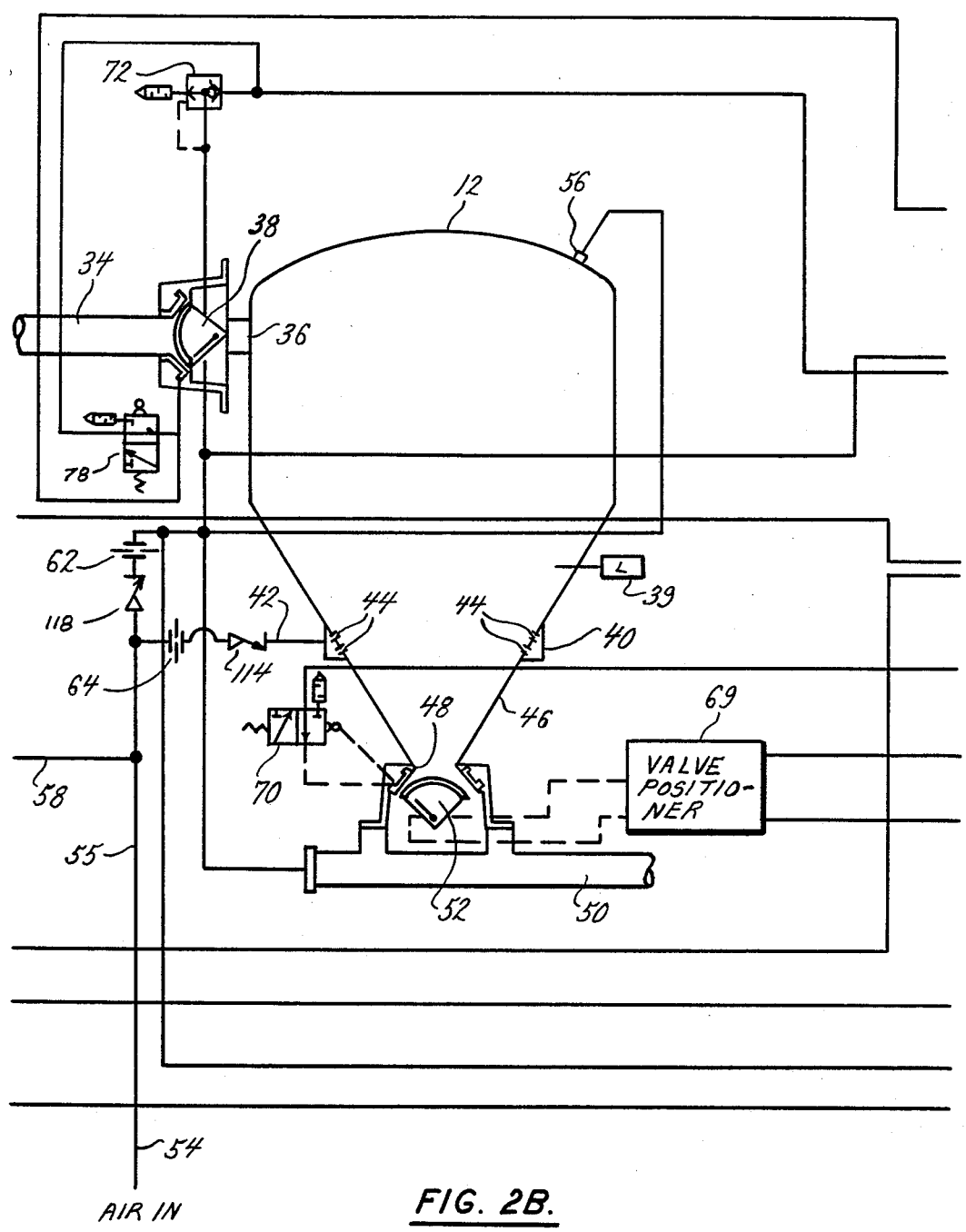
Figure 2C:
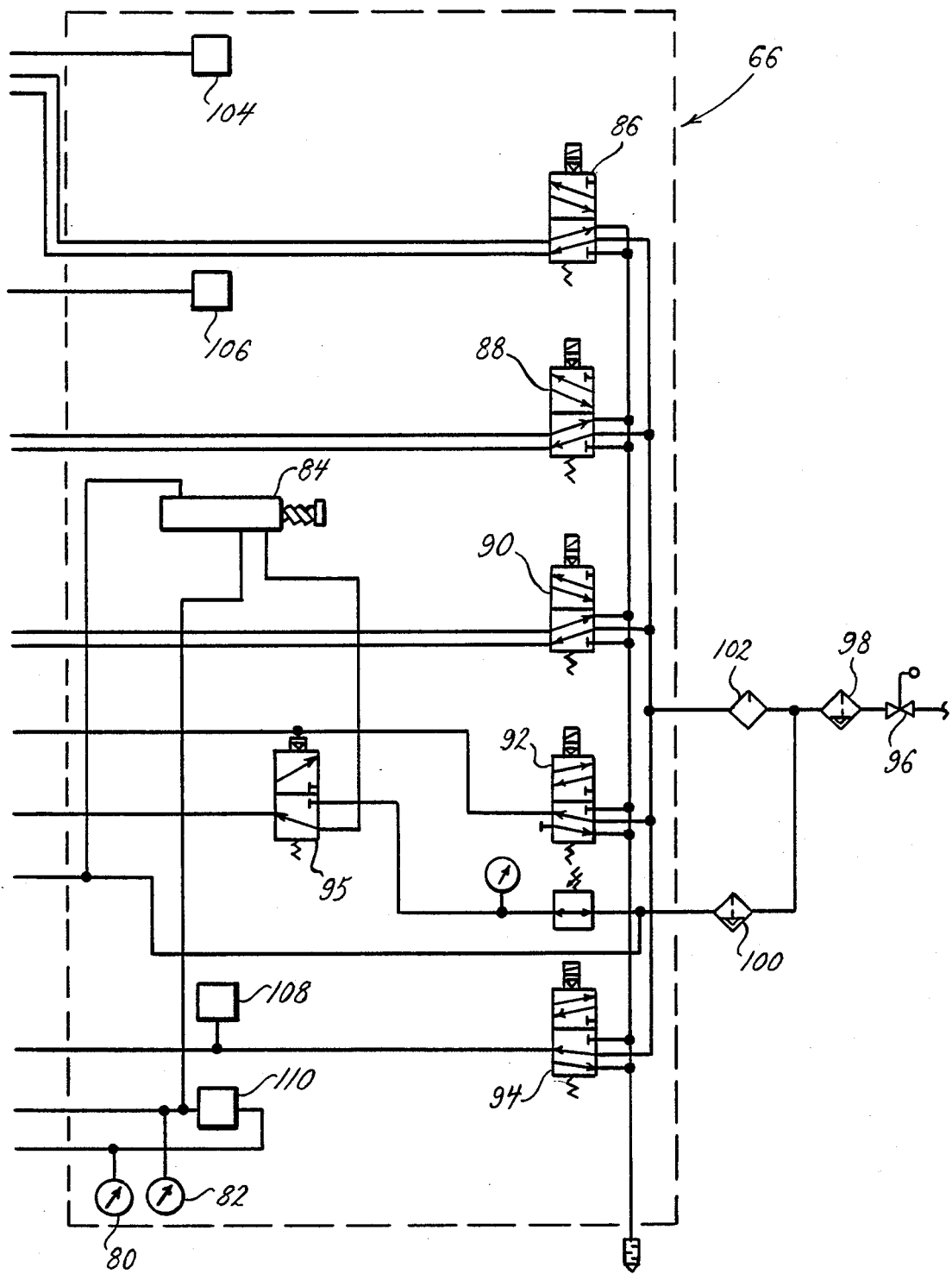

The control and instrumentation system for applicant's transfer and dispensing equipment, shown as 66 in FIG. 2c, may be a conventional pneumatically operated system utilizing pressure sensors and pneumatic operating valves. It will be appreciated that other conventional control systems may be used, for example, utilizing electrical motor driven or solenoid operated valves incorporated in a system of sensors. The entire system could be controlled by an on-line microprocessor, suitably programmed, or by a general purpose computer. Alternatively, the valving for the system could be operated manually to control the system.

As shown in FIGS. 2a through 2c, a pneumatic control system 66 utilizes high pressure air from the main line 54, suitably reduced in pressure, to provide the motive power for the control system. The air may be utilized, in response to a suitable signal, to provide power to the control valves such as butterfly valve 68 in line 58 and dome valves 20, 38 and 52, for example by valve positioners such as that shown as 69 for valve 52. The air supply also provides power to operate quick release valves 70, 72, 74, 76 and 78. The control system 66 may further include pressure gauge 80 for transfer vessel 14 and gauge 82 for the dispensing vessel 12. A ratio controller 84 provides a signal to control the action of valve positioners 69. The action of the system is further controlled by the operation of solenoid valves 86, 88, 90, 92, 94 and 95 in the system, and these valves are also supplied with air from the main line 54 through ball valve 96. The system is equipped with suitable filters 98 and 100 and lubricator 102, and the air lines into the system are also provided with suitable check valves 104, 106 and 108.

OPERATION OF THE DEVICE

As can be seen in FIG. 1, the bulk feeding hopper 16 is situated with its outlet relatively close to ground level and below the entrance for the dispensing vessel 12. Transfer vessel 14, which may be relatively small and limited in height, is positioned beneath the outlet of hopper 16. With this arrangement the dispensing vessel 12 can be placed in a spaced apart relationship from hopper 16 and transfer vessel 14. Material may be transferred from hopper 16 through transfer vessel 14 to dispensing vessel 12, without pressure loss, as described herein.

At the beginning of a cycle, rotary valve 20 is opened permitting material to enter transfer vessel 14 from hopper 16 under the influence of gravity. When sufficient material has entered transfer vessel 14, a level control sensor 27, preferably a limit switch, generates a signal to the control network 66 to close valve 20. Air is introduced into transfer vessel 14 through line 58, orifice plate 60 and plenum 22 by operation of valve 68. The air is distributed through brushes 24 to aerate and fluidize the material in transfer vessel 14, and when sufficient pressure has built up in the interior of transfer vessel 14, the control system 66 opens valve 38 to permit the transfer of material from transfer vessel 14 into the interior of dispensing vessel 12 through inlet 36. Normally a differential pressure, between transfer vessel 14 and dispensing vessel 12, of about one psi is sufficient to transfer the material. Operating differential pressures between transfer vessel 14 and dispensing vessel 12 are typically between about two psi and two and one-half psi, but greater or lesser pressure drops may be used, if desired. For example, if pipe 34 is long enough to create a significant pressure drop or if a large vertical lift of the material is needed, the pressure drop between transfer vessel 14 and dispensing vessel 12 may be increased.

When the level of material in transfer vessel 14 drops below the preselected level for a level control sensor 39 (preferably a limit switch) a signal is sent through the control system 66 causing valve 68 and valve 38 to close and causing valve 20 to again open to reinitiate the filling cycle for transfer vessel 14.

Dispensing vessel 12 holds a store of material and maintains the material in an aerated condition by introducing air through line 42 and plenum 40 through perforations 44 in the dispensing vessel 12. The aerated material is dispensed through exit 48 controlled by a dome valve 52 into exit line 50. Dome valve 52 is controlled through the control system 66 by a valve positioner 69 which senses and responds to the pressure differential through outlet 48, and normally the pressure differential for dispensing is set at one psi difference across the outlet. If the pressure drop across the valve positioner 69 increases, the valve 52 partially closes to restrict the flow. If too little back pressure is measured, the valve 52 opens to a greater extent to increase the flow.

When the level of material in dispensing vessel 12 reaches a predetermined point measured by the level sensor 39, preferably a limit switch, a signal is generated to the control system 66 which causes valve 38 to open and valve 68 to open. Air is introduced into the transfer vessel through line 58 and material is transferred from the transfer vessel 14 into the dispensing vessel 12 through line 34. The transfer of material proceeds until either the level sensor in the transfer vessel 14 determines that the supply of material in the transfer vessel 14 is nearly exhausted, in which case the transfer cycle is terminated and valves 68 and 38 are closed, or until the level of material in dispensing vessel 12 reaches a sufficiently high level. A signal from the level sensor in the dispensing vessel 12 closes valves 38 and 68 terminating the transfer cycle.

It will be appreciated that when transfer to dispensing vessel 12 is terminated a new fill cycle for transfer vessel 14 is initiated. The dispensing cycle continues uninterrupted throughout multiple sequences of transferring material from transfer vessel 14 so that continuous dispensing is achieved while intermittently transferring material to the dispensing vessel 12.

The differential pressure between transfer vessel 14 and dispensing vessel 12 is maintained by the different orifice sizes in orifice plates 60 and 62 in lines 54 and 58 respectively. Orifice plate 60 is chosen to have a smaller pressure drop than orifice plate 62 to maintain the desired differential pressure. For example, when the inlet pressure in line 54 is a four inch line at fifteen psi and line 58 is a three inch line, the orifice plate 60 may have an orifice diameter of about three-quarters (¾) inch and orifice plate 62 may have an orifice diameter of about one (1) inch. Orifice plate 64 is also chosen to maintain a pressure drop into dispensing vessel 12 sufficient to aerate the material therein, usually about one psi drop is sufficient and may be provided by a one and one-quarter ($1\frac{1}{4}$) inch orifice plate. It will be appreciated that other pressures, orifice sizes and line sizes may be used to provide a suitable pressure drop. The pressure in line 54 can be up to 45 psi or more, depending on the pressure source available.

Although the invention has been shown in connection with certain specific embodiments it will be readily apparent to those skilled in the art that various changes in form and arrangement of parts may be made to suit the requirements of a particular installation without departing from the spirit and scope of the invention. Applicant's invention is to be limited only by the scope of the claims appended hereto and not to the embodiments given herein for purposes of illustration.

What is claimed is:

1. In a system for moving particulate material from a transfer vessel to a dispensing vessel for introduction of the particulate material from the bottom of the dispensing vessel onto a conveyer line, said system comprising:

a single source of pressurized fluid for supplying fluid to each of the transfer and dispensing vessels at pressures above atmospheric pressure;

a first supply conduit connected between said single source and the transfer vessel;

first control means associated with said first supply conduit for controlling the pressure of fluid supplied to the transfer vessel;

a second supply conduit connected between said single source and the dispensing vessel for delivering fluid from said single source into the dispensing vessel at an elevated location therein, which elevated location is spaced a substantial distance above the bottom of the dispensing vessel;

second control means disposed in said second supply conduit for controlling the pressure of fluid supplied to the elevated location in the dispensing vessel so that a positive pressure differential is created from the transfer vessel to the elevated location in the dispensing vessel;

conduit transfer structure extending between the transfer vessel and the dispensing vessel permitting movement therethrough of particulate material from the transfer vessel to the dispensing vessel by means of the created pressure differential between the transfer vessel and the elevated location in the dispensing vessel and the conduit transfer structure being connected to said dispensing vessel at a location spaced a substantial distance above the bottom of the dispensing vessel for discharge of particulate material into said dispensing vessel at a location proximate to said elevated location.

2. The system of claim 1 wherein the transfer and dispensing vessels are so disposed relative to one another that the location at which particulate material enters the conduit transfer apparatus is located vertically below the location at which particulate material is discharged from the conduit transfer structure to the dispensing vessel.

3. The system as defined in claim 1 further including a third conduit connected between said second supply conduit and the dispensing vessel for delivering fluid from said single source into the dispensing vessel at a location adjacent the bottom thereof and an additional control means associated with the third conduit for controlling the pressure of fluid supplied to the dispensing vessel at the location adjacent the bottom thereof and so that fluid supplied to the dispensing vessel through the third conduit promotes an aeration of particulate material discharged into the dispensing vessel.

4. The system of claim 2 further including valve means associated with the conduit transfer structure for regulating the flow of particulate material from the transfer vessel to the dispensing vessel.

5. The system of claim 1 wherein the transfer vessel includes means operatively positioned between the first supply conduit and particulate material contained within the transfer vessel for fluidizing material contained in the transfer vessel with fluid supplied thereto through the first supply conduit.

6. The system of claim 1 wherein the dispensing vessel includes means operatively positioned between the second supply conduit and particulate material collected within the dispensing vessel for fluidizing material collected in the dispensing vessel with fluid supplied thereto through the second supply conduit.

7. The system of claim 6 wherein the means for fluidizing material in the dispensing vessel includes plenum means associated with the dispensing vessel, the plenum means having foraminous means positioned between the interior of the dispensing vessel and the second supply conduit 8. The system of claim 1 further comprising means for intermittently transferring material from the transfer vessel to the dispensing vessel while continuously dispensing material from the dispensing vessel into the conveyer line.

9. The system as defined in claim 1 wherein at least one of said first and second control means includes an orfice plate.

10. The system of claim 1 wherein the first control means includes a first orifice plate mounted in the first supply conduit and the second control means includes a second orifice plate mounted in the second supply conduit, the orifice plates being sized to produce a positive pressure differential from the transfer vessel to the dispensing vessel.

11. The system of claim 1 wherein the source of pressurized fluid includes a source of compressed air.

12. The system of claim 1 wherein the device includes a control valve associated with the first and second supply conduit.

13. The system of claim 5 wherein the means for fluidizing material in the transfer vessel includes plenum means associated with the transfer vessel, the plenum means having foraminous means positioned between the interior of the transfer vessel and the first supply conduit.

14. In a pneumatic transfer device for introducing particulate matter into a pressurized fluid conduit, the device having a dispensing vessel and a transfer vessel, the improvement comprising:
  a single source of pressurized fluid;
  a first supply conduit connected between said source and the transfer vessel;
  first control means disposed in said first supply conduit for controlling the pressure of fluid supplied to the transfer vessel and for selectively blocking the supply of pressurized fluid to the transfer vessel;
  a second supply conduit connected between said source and the dispensing vessel;
  second control means disposed in said second supply conduit for controlling the pressure of fluid supplied to the dispensing vessel so that a positive pressure differential exists from the transfer vessel to the dispensing vessel;
  transfer structure partially contained within the transfer vessel and extending to the dispensing vessel for entraining particulate matter in the pressurized fluid supplied by the first supply conduit and for transferring the entrained particulate matter to the dispensing vessel;
  means for selectively feeding particulate matter to the transfer vessel;
  third control means for selectively blocking said transfer structure to block the flow of entrained particulate matter to the dispensing vessel;
  a sensor for sensing the amount of particulate matter in the dispensing vessel and for generating a sensor signal when a predetermined amount of particulate matter is sensed;
  said first control means being responsive to the sensor signal to block the supply of pressurized fluid to the transfer vessel during the presence of the sensor signal;
  said third control means being operable to block said transfer structure during the presence of the first sensor signal, whereby entrained particulate matter is intermittently supplied to the dispensing vessel by the pneumatic transfer structure; and
  fourth control means for controlling the rate at which particulate matter is introduced into the pressurized fluid conduit so that the intermittent supply of particulate matter to the dispensing vessel is sufficient to provide a substantially continuous supply of particulate matter from the dispensing vessel.

15. A method of transferring particulate material into a conveyer line, the method including the steps of
  moving the material from a storage source to a transfer vessel,
  providing a single source of pressurized fluid and supplying fluid to each of the transfer and dispensing vessels at pressures above atmospheric pressure,
  creating a positive pressure differential between the transfer vessel and an elevated location within a dispensing vessel by means of the fluid supplied to each of the transfer and dispensing vessels wherein the elevated location is spaced a substantial distance above the bottom of the dispensing vessel so that the creation of such a differential is not dependent upon an aerated condition of the particulate material collected in the dispensing vessel,
  moving the material from the transfer vessel to the dispensing vessel by means of the created pressure differential so that material is discharged into the dispensing vessel at a location proximate to the elevated location, and
  continuously dispensing the material into the conveyer line from the dispensing vessel throughout the movement of the material to and from the transfer vessel.

16. The method of claim 15 wherein the step of moving the material from the transfer vessel to the dispensing vessel includes a step of lifting the material from the transfer vessel to the dispensing vessel.

17. The method of claim 16 wherein the step of creating is preceded by a step of connecting a single source of pressurized fluid to the transfer vessel and to the dispensing vessel so that the pressure of fluid flowing into the transfer vessel and into the dispensing vessel is responsible for the creation of the positive pressure differential as aforesaid.

* * * * *